May 31, 1960
R. REGER
2,938,541
VALVE
Filed May 29, 1958
2 Sheets-Sheet 1
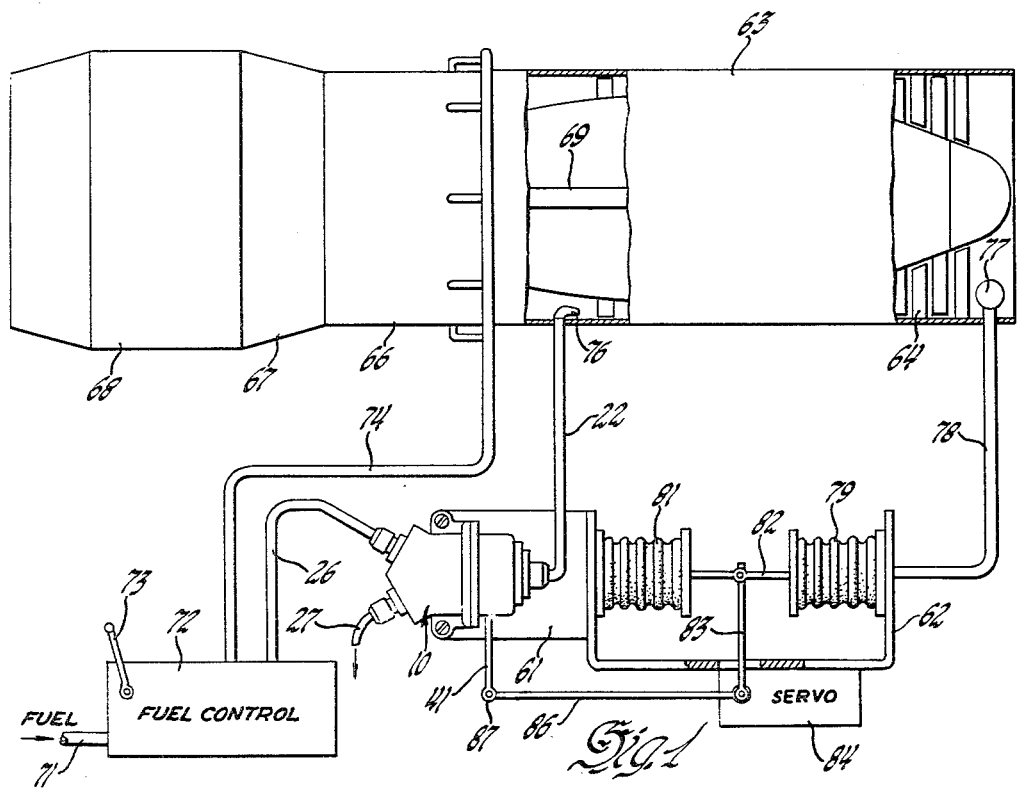
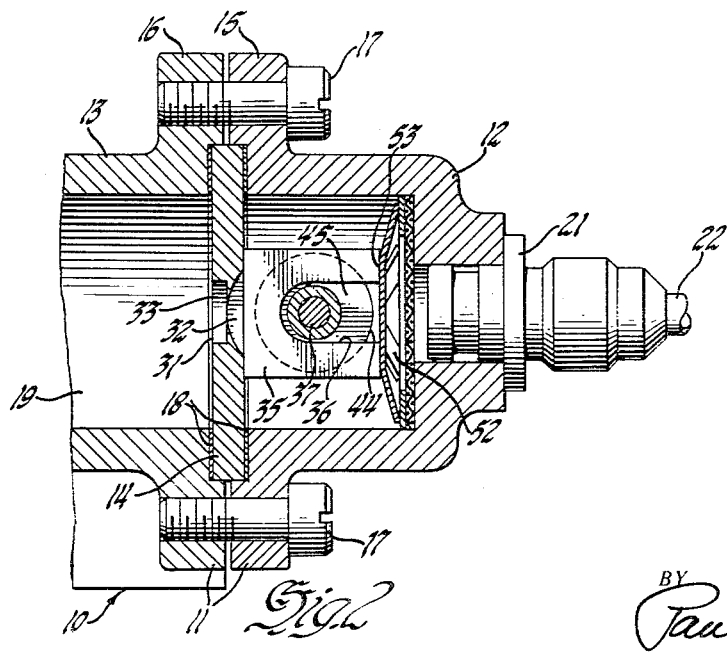
INVENTOR.
Raymond Reger
BY
Paul Fitzpatrick
ATTORNEY

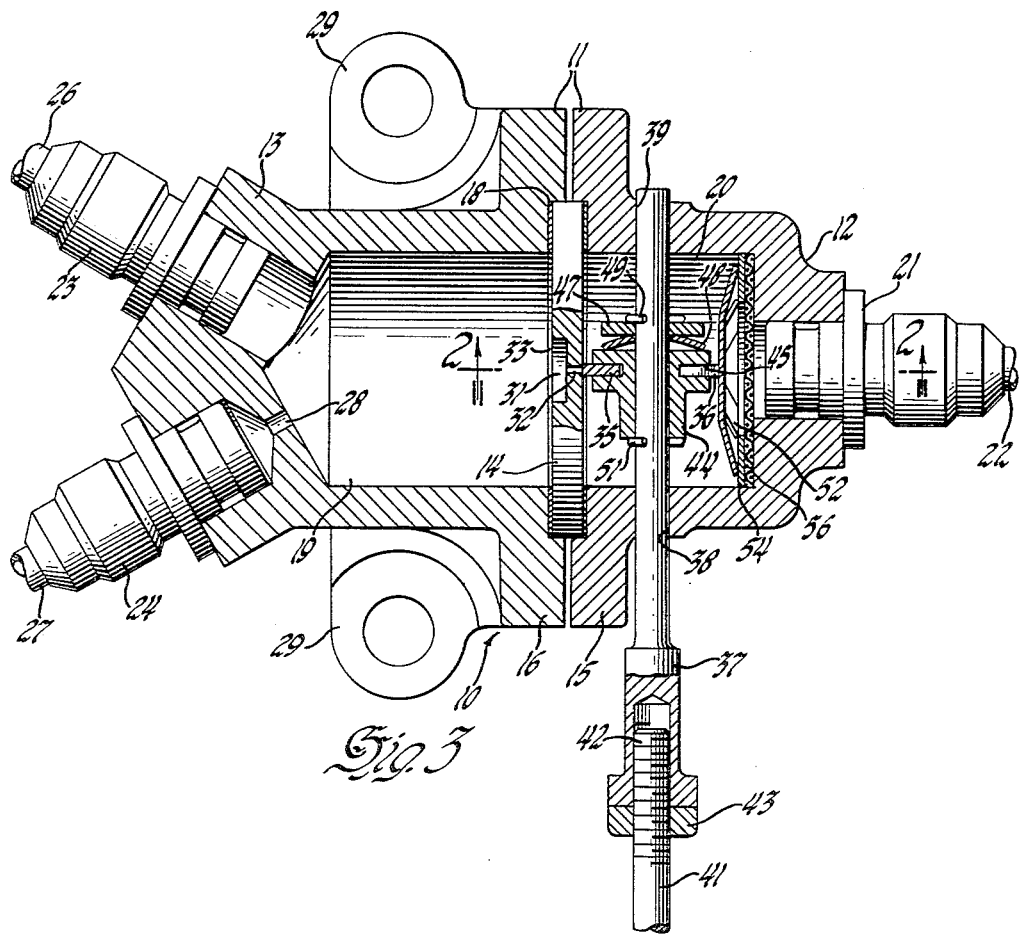

United States Patent Office 2,938,541
Patented May 31, 1960

2,938,541

VALVE

Raymond Reger, Indianapolis, Ind., assignor to General Motors Corporation, Detroit, Mich., a corporation of Delaware Filed May 29, 1958, Ser. No. 738,786

4 Claims. (Cl. 137—550)

My invention relates to a valve, and particularly to an improved throttling valve especially suited for use in control systems of various sorts. The improved valve is characterized by structure which provides for rapid opening with a short stroke and for the use of readily replaceable components either to alter valve characteristics or to replace worn parts. The valve has a strong self-cleaning action, and is particularly simple in structure and economical to manufacture and assemble.

The principal object of the invention is to provide a simple and reliable throttling valve particularly adapted for control systems.

The nature of the invention and the advantages thereof will be apparent to those skilled in the art from the succeeding detailed description of the preferred embodiment of the invention and the accompanying drawings.

Figure 1 is a schematic diagram of a portion of a gas turbine control system incorporating the valve of the invention.

Figure 2 is a fragmentary sectional view of the valve taken on the plane indicated by the line 2—2 in Figure 3.

Figure 3 is a sectional view of the valve.

Referring first to Figures 2 and 3, the valve 10 comprises a case 11 made in two parts, a first or inlet part 12, and a second or outlet part 13. The fixed structure of the valve also includes a circular valve seat plate 14 mounted in recesses in the flanges 15 and 16 of the case parts. The two parts of the case are held together and the seat plate is retained between them by cap screws 17. Gaskets 18 may be provided to seat the junction between the seat plate and the parts of the case.

With these parts thus assembled, the inlet part of the case defines a preferably cylindrical inlet chamber 20 and the outlet part of the case defines an outlet chamber 19, also preferably cylindrical. The inlet end of the case is provided with a conventional pipe fitting 21 fixed in the case to receive an inlet pressure line 22. The outlet end of the case is provided with two conventional pipe fittings 23 and 24, which connect the outlet chamber to a controlled pressure outlet line 26 and a bleed line 27. Chamber 19 is connected to the bleed line 27 through a restricted orifice 28. Feet 29 on the case provide for mounting the valve on any suitable support.

The seat plate is machined to provide a port 31 through the plate which may have any desired configuration, but for the particular application described herein preferably comprises a saw cut 32 in the seat face of the plate which cuts through to a circular recess 33 in the opposite face. The saw cut 32 which defines the throttle valve port is controlled by a wiper plate 35 disposed edgewise to seat plate 14. As will be most clearly apparent from Figure 3, plate 35 is rectangular and has a notch 36 cut into it from the edge opposite the seat. Wiper plate 35 is moved over the plate 14 by a valve stem 37 slidably mounted in bores 38 and 39 in the inlet case part. Stem 37 is adjustably coupled to an actuating rod 41 by a threaded connection 42 and a jam nut 43.

The wiper plate is coupled to the stem by a connecting member or collar 44 which is preferably of circular cross section and which has a circumferential groove 45 of such width as to locate the plate 35 accurately on the stem, but permit it to adjust at right angles to the stem into good wiping contact with the plate. Collar 44 is removably mounted on the stem for assembly and disassembly of the valve by a washer 47, a Belleville or other spring washer 48, and cotter keys or equivalent retainers 49 and 51.

The wiper plate is kept in contact with the seat plate by a spring plate 52 which has a central flat portion 53 engaged by the edge of the wiper plate and has a number of spring fingers extending from the portion 53 which engage a washer 54. A screen or filter 56 is disposed over the inlet and retained by the washer 54 and spring plate 52. As will be seen, the spring plate provides sufficient pressure to maintain the wiper plate in engagement with the seat plate. The side of the wiper plate which engages the seat plate preferably has sharp edges so that it is effective to scrape any dirt which may pass the screen from the seat plate. It will be apparent from the foregoing that the valve structure described is not only simple and easy to assemble or disassemble, but that it is self-cleaning. It is also self-adjusting, since wear of the wiper plate within reasonable limits is compensated by the spring plate 52.

The operation of the valve may be explained in terms of an illustrative installation thereof. Figure 1 shows the valve assembly 10 as previously described mounted on a supporting plate 61 to which is fixed a bracket 62. The system valve illustrated in Figure 1 provides a signal of compressor outlet pressure modulated by compressor inlet temperature of a gas turbine engine to a fuel control for the gas turbine. The gas turbine engine, which may be conventional, comprises an outer case 63 housing a compressor 64, a combustion section 66, a turbine 67 and an exhaust duct 68. The turbine drives the compressor through a shaft 69. Fuel is supplied to the engine from any suitable source 71 through a fuel control 72, the power setting of which is determined by an input lever 73. Fuel metered by the control is supplied through a line 74 to the combustion section of the engine.

A ram pressure probe 76 in the outlet duct from the compressor is connected through line 22 to the inlet of valve 10. Temperature bulb 77 in the compressor inlet is connected by a pressure line 78 to a sealed bellows 79 mounted on the support 62. The pressure in line 78 acting on bellows 79 is a function of the temperature of the air entering the compressor. An evacuated ambient pressure compensating bellows 81 is mounted on the bracket 62 in opposition to bellows 79. The free ends of the two bellows are connected by a strut 82 to which is connected an arm 83, the movements of which are determined by the compressor inlet temperature. Arm 83 provides an input to any suitable servomechanism 84 mounted on the bracket 62. Servomechanism 84 drives an output arm 86 in accordance with the movement of input arm 83. Arm 86 is pivoted at 87 to the input shaft 41 and stem 37 of valve 10. The details of the connection of the rod 41 to the stem are not illustrated in Figure 1.

As will be apparent, the pressure in the inlet chamber 20 of valve 10 will be total compressor outlet pressure. The position of valve stem 37 and, therefore, the area of port 32 will be a function of compressor inlet temperature. The control outlet 23 of the valve is connected through line 26 to the fuel control. The outlet 27 which is supplied from chamber 19 through the orifice 28 is bled to ambient pressure. The control line 26 may terminate in a bellows or other pressure responsive device (not shown) in the fuel control so that there is no continuous flow through line 26. Pressure in line 26 will be a function of compressor discharge pressure and compressor inlet temperature. If the valve port 32 is wide open, the pressure in line 26 will be some fraction of compressor inlet pressure determined by the relative pressure drops through port 32 and bleed orifice 28. As port 32 is closed, the ratio of the pressure in line 26 to compressor outlet pressure is decreased by increased throttling at port 32. The apparatus is connected so that increase of inlet temperature opens the orifice 32 so that the control pressure in line 26 is increased both by increasing compressor outlet pressure and by increasing inlet temperature. This control pressure may serve as an index of the approach of the compressor to safe operating limits, and may be utilized by suitable mechanism in the fuel control (which is not illustrated, and the details of which are immaterial to my invention) to limit fuel flow to the engine to keep the compressor with a safe operating limit.

This particular system described is merely illustrative of various control systems in which the valve of the invention may be used and is indicative of the merits of the invention for control systems in general.

One advantage of the invention is that the configuration of the port in the seat platen may easily be changed by substitution of seat plates to fit the valve to various systems or variations in operation requirements.

The detailed description of the preferred embodiment of the invention for the purpose of explaining the principles thereof is not to be construed as limiting or restricting the invention, as many modifications may be made by the exercise of skill in the art within the scope of the invention.

What is claimed is:

1. A control valve comprising, in combination, a case, a valve seat plate in the case, the plate dividing the case into a first chamber and a second chamber, the plate having a port therethrough connecting the chambers, a valve stem reciprocably mounted in the case for movement parallel to the plate, a collar on the stem within the first chamber having a groove therein normal to the plate, a flat valve wiper plate mounted in the groove with freedom of movement normal to the seat plate, the wiper plate having an edge engaging the seat plate and movable over the port by movement of the stem, and a spring plate mounted in the case engaging the case and an edge of the wiper plate opposite the seat plate, the case defining an inlet to the first chamber and an outlet from the second chamber.

2. A control valve comprising, in combination, a first case part, a second case part, a valve seat plate, means fixing the case parts together to provide a case with the plate held between the case parts, the plate dividing the case into a first chmber in the first case part and a second chamber in the second case part, the plate having a port therethrough connecting the chambers, a valve stem reciprocably mounted in the first case part for movement parallel to the plate, a collar on the stem having a groove therein normal to the plate, a flat thin valve wiper plate mounted in the groove with freedom of movement normal to the seat plate, the wiper plate having an edge engaging the seat plate and movable over the port by movement of the stem, and a spring plate engaging the case and an edge of the wiper plate opposite the seat plate, the first case part defining an inlet to the first chamber and the second case part defining an outlet from the second chamber.

3. A control valve comprising, in combination, a first case part, a second case part, a valve seat plate, means fixing the case parts together to provide a case with the plate held between the case parts, the plate dividing the case into a first chamber in the first case part and a second chamber in the second case part, the plate having a port therethrough connecting the chambers, a valve stem reciprocably mounted in the first case part for movement parallel to the plate, a collar on the stem having a groove therein normal to the plate, a flat thin valve wiper plate having a notch to receive the collar and arms extending past the collar mounted in the groove with freedom of movement normal to the seat plate, the wiper plate having an edge engaging the seat plate and movable over the port by movement of the stem, and a spring plate mounted in the case engaging the case and the arms of the wiper plate opposite the seat plate, the first case part defining an inlet to the first chamber and the second case part defining an outlet from the second chamber.

4. A control valve comprising, in combination, a first case part, a second case part, a valve seat plate, means fixing the case parts together to provide a case with the plate held between the case parts, the plate dividing the case into a first chamber in the first case part and a second chamber in the second case part, the plate having a port therethrough connecting the chambers, a valve stem reciprocably mounted in the first case part for movement parallel to the plate, a collar on the stem having a groove therein normal to the plate, a flat thin valve wiper plate mounted in the groove with freedom of movement normal to the seat plate, the wiper plate having an edge engaging the seat plate and movable over the port by movement of the stem, a spring plate mounted in the case engaging an edge of the wiper plate opposite the seat plate, and a filter retained between the plate and the case, the first case part defining an inlet to the first chamber disposed behind the filter, and the second case part defining an outlet from the second chamber and a bleed orifice from the second chamber.

References Cited in the file of this patent

UNITED STATES PATENTS

| | | |
|---|---|---|
| 104,037 | King | June 7, 1870 |
| 1,035,803 | Mintz | Aug. 13, 1912 |
| 1,550,725 | Jung | Aug. 25, 1925 |
| 2,331,393 | Hall | Oct. 12, 1943 |
| 2,650,455 | Jacobsson | Sept. 1, 1953 |
| 2,669,416 | Hilton | Feb. 16, 1954 |
| 2,747,607 | Matasovic | May 29, 1956 |
| 2,796,136 | Mock | June 18, 1957 |
| 2,819,728 | Gage | Jan. 14, 1958 |
| 2,828,767 | Barusch | Apr. 1, 1958 |
| 2,835,468 | Sparks | May 20, 1958 |

UNITED STATES PATENT OFFICE
CERTIFICATE OF CORRECTION

Patent No. 2,938,541                                     May 31, 1960

Raymond Reger

It is hereby certified that error appears in the printed specification of the above numbered patent requiring correction and that the said Letters Patent should read as corrected below.

Column 1, line 44, for "seat" read -- seal --; column 3, line 27, for "platen" read -- plate --.

Signed and sealed this 4th day of April 1961.

(SEAL)
Attest: ERNEST W. SWIDER

XXXXXXXXX
Attesting Officer

ARTHUR W. CROCKER
Acting Commissioner of Patents